(12) United States Patent
Ishizaka

(10) Patent No.: US 11,913,663 B2
(45) Date of Patent: Feb. 27, 2024

(54) AIR-CONDITIONING CONTROL DEVICE AND AIR-CONDITIONING CONTROL SYSTEM

(71) Applicant: Mitsubishi Electric Corporation, Tokyo (JP)

(72) Inventor: Taichi Ishizaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 392 days.

(21) Appl. No.: 17/435,184

(22) PCT Filed: Jun. 12, 2019

(86) PCT No.: PCT/JP2019/023328
§ 371 (c)(1),
(2) Date: Aug. 31, 2021

(87) PCT Pub. No.: WO2020/250347
PCT Pub. Date: Dec. 17, 2020

(65) Prior Publication Data
US 2022/0146137 A1 May 12, 2022

(51) Int. Cl.
*F24F 11/65* (2018.01)
*F24F 11/46* (2018.01)
(Continued)

(52) U.S. Cl.
CPC .............. *F24F 11/65* (2018.01); *F24F 11/46* (2018.01); *F24F 11/79* (2018.01); *G05B 19/042* (2013.01);
(Continued)

(58) Field of Classification Search
CPC .. F24F 11/46; F24F 11/50; F24F 11/56; F24F 11/58; F24F 11/62; F24F 11/64;
(Continued)

(56) References Cited

U.S. PATENT DOCUMENTS 4,407,447 A * 10/1983 Sayegh .............. G05D 23/1902
165/205
8,219,252 B2 7/2012 Nanami
(Continued)

FOREIGN PATENT DOCUMENTS

CN 201191048 Y 2/2009
CN 105115103 A 12/2015
(Continued)

OTHER PUBLICATIONS

Office Action dated Jan. 19, 2023 in corresponding CN Patent Application No. 201980096755.7 (with partial English machine translation).
(Continued)

*Primary Examiner* — Chun Cao
(74) *Attorney, Agent, or Firm* — POSZ LAW GROUP, PLC

(57) ABSTRACT

An air-conditioning control device controlling operation of a plurality of air conditioners, includes: an air conditioner management unit managing operating states of the air conditioners; an image analysis unit analyzing image information obtained from an image sensor and ascertaining a person in each of air conditioning areas that are subjected to controlled air conditioning by the air conditioners; air-conditioning communication line connection units corresponding respectively to the air conditioning areas and connectable with air-conditioning communication lines connected to the air conditioners; an air-conditioning communication line connection determination unit capable of determining whether or not the air conditioners are connected to the air-conditioning communication line connection units via the air-conditioning communication lines; and an air-conditioning control unit providing, based on the number of persons in each air conditioning area, air conditioning area-specific operation control for the air conditioners connected (Continued)

to the air-conditioning communication line connection units via the air-conditioning communication lines.

8 Claims, 9 Drawing Sheets

(51) Int. Cl.
- *F24F 11/79* (2018.01)
- *G05B 19/042* (2006.01)
- *F24F 120/12* (2018.01)

(52) U.S. Cl.
CPC .. *F24F 2120/12* (2018.01); *G05B 2219/2614* (2013.01)

(58) Field of Classification Search
CPC ........ F24F 11/65; F24F 11/79; F24F 2120/10; F24F 2120/12; G05B 19/042; G05B 2219/2614
USPC .......................................................... 700/276
See application file for complete search history.

(56) References Cited

U.S. PATENT DOCUMENTS

| | | | |
|---|---|---|---|
| 2010/0019051 A1* | 1/2010 | Rosen | F24F 11/30 236/46 R |
| 2011/0205366 A1* | 8/2011 | Enohara | F24F 11/30 348/143 |
| 2013/0168038 A1* | 7/2013 | Ishizaka | F24F 3/065 165/11.1 |
| 2019/0285307 A1 | 9/2019 | Sugiyama | |

FOREIGN PATENT DOCUMENTS

| | | |
|---|---|---|
| CN | 106196429 A | 12/2016 |
| JP | 3048825 B | 6/2000 |
| JP | 2002-031391 A | 1/2002 |
| JP | 2006-098016 A | 4/2006 |
| JP | 2006-183974 A | 7/2006 |
| JP | 2009-299933 A | 12/2009 |
| JP | 2011-117625 A | 6/2011 |
| JP | 2011-127782 A | 6/2011 |
| JP | 2013-204835 A | 10/2013 |
| JP | 2017-48931 A | 3/2017 |
| WO | 2010/079727 A1 | 7/2010 |
| WO | 2018/029797 A1 | 2/2018 |

OTHER PUBLICATIONS

International Search Report dated Jul. 30, 2019, issued in corresponding International Application No. PCT/JP2019/023328 (and English Machine Translation).

Office Action dated Jul. 12, 2022 corresponding with Japanese Patent Application No. 2021-525478 (and English machine translation).

Office Action dated Jul. 26, 2022 corresponding with Chinese Patent Application No. 201980096755.7 (and English machine translation).

Extended European Search Report dated May 16, 2022 from the European patent office for the corresponding application No. 19932452.6.

* cited by examiner

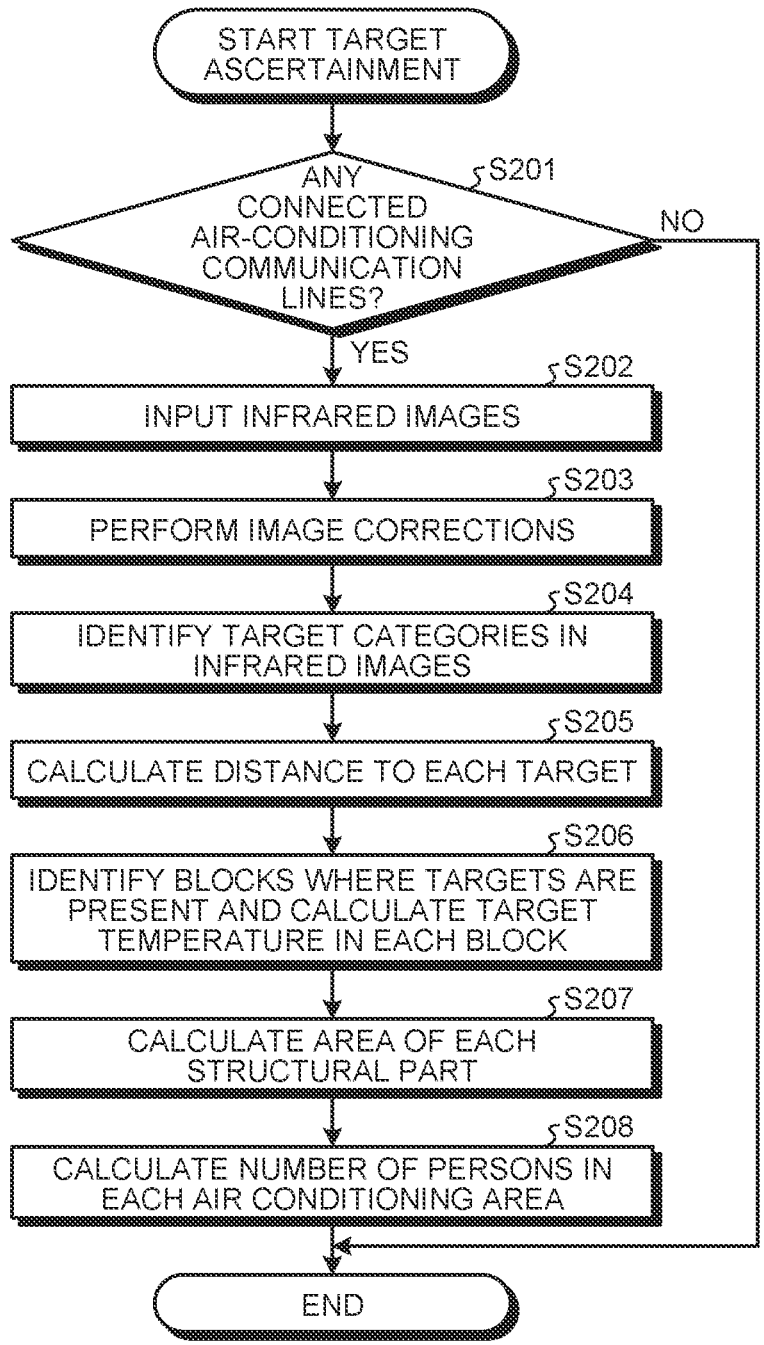

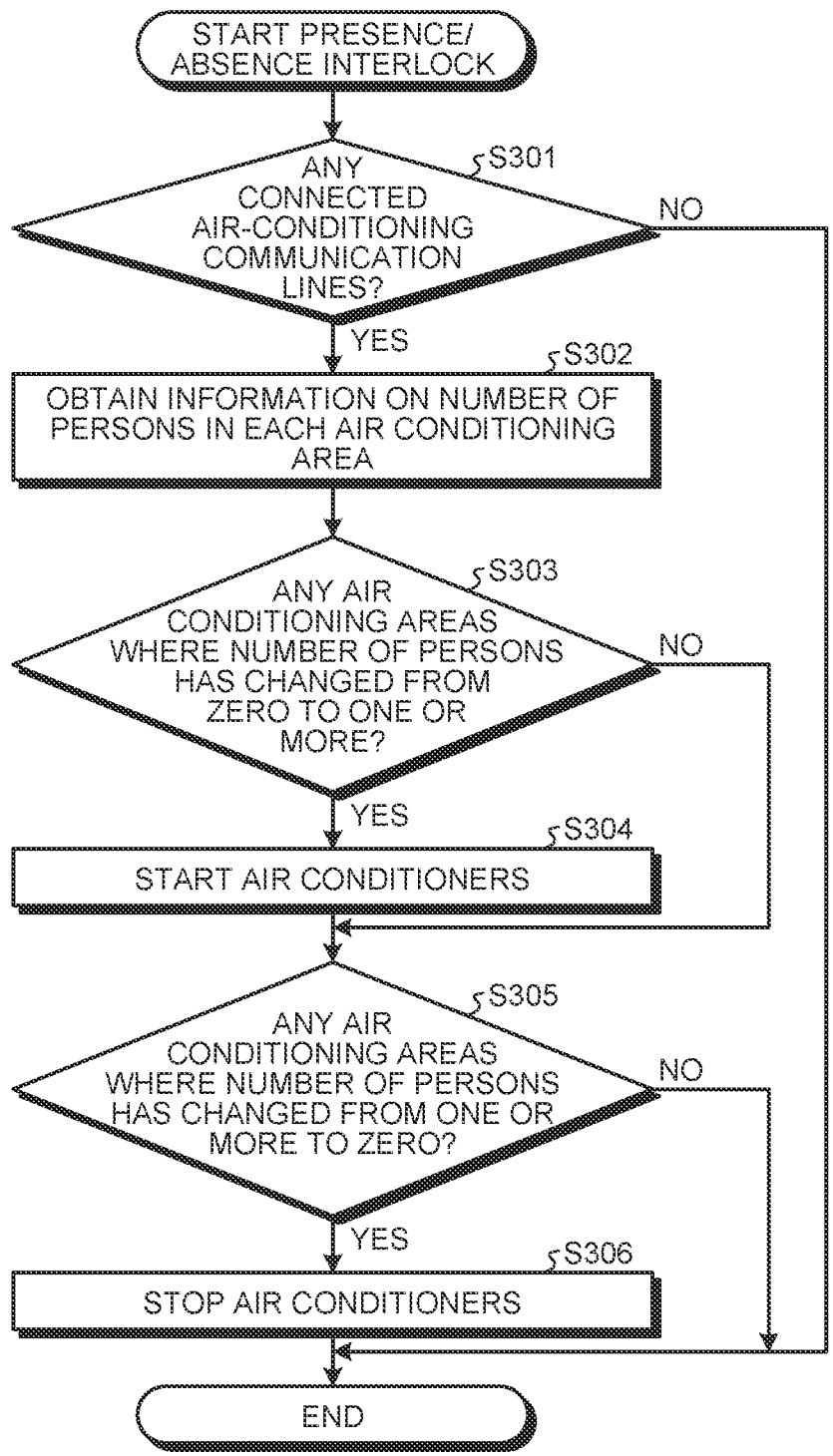

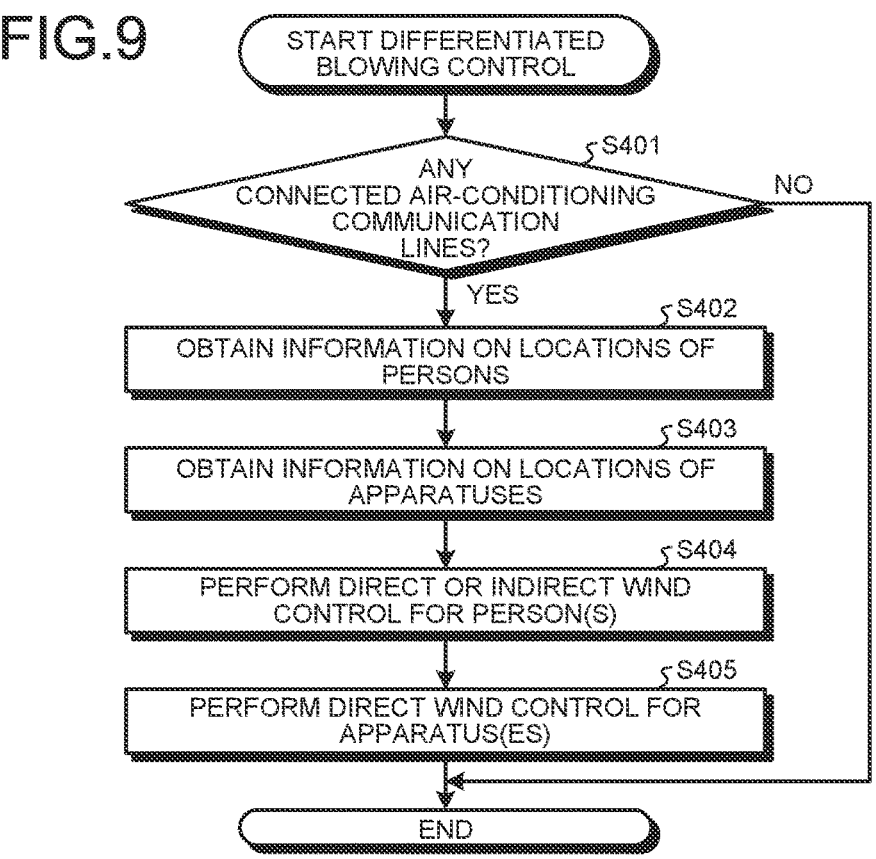
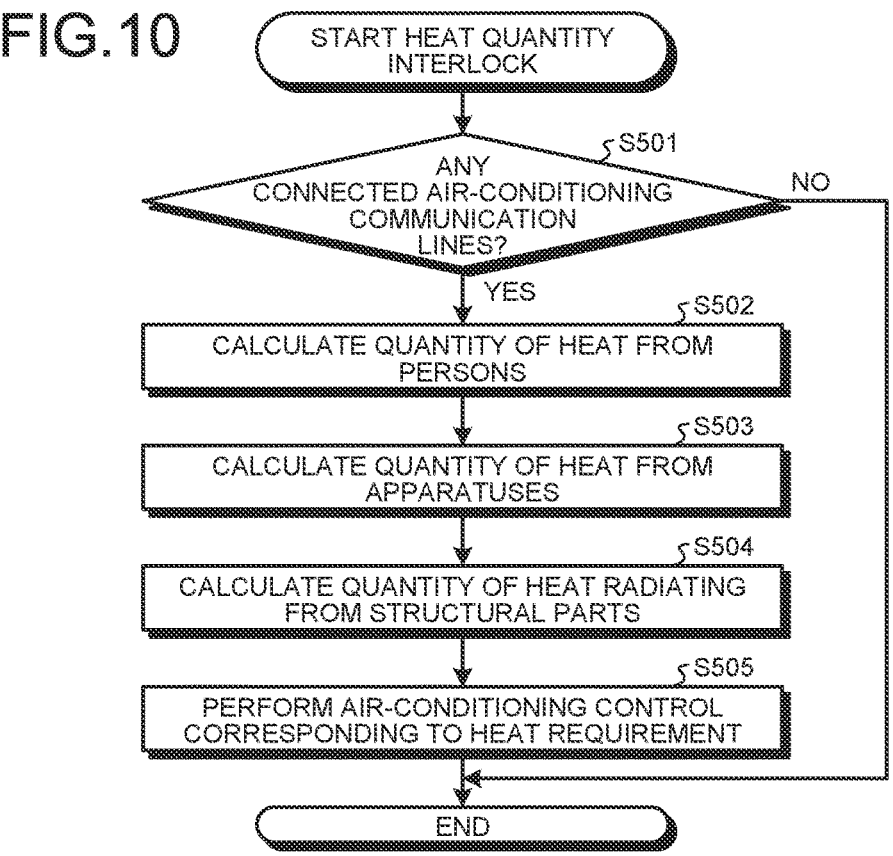

AIR-CONDITIONING CONTROL DEVICE AND AIR-CONDITIONING CONTROL SYSTEM

CROSS REFERENCE TO RELATED APPLICATION

This application is a U.S. National Stage Application of International Application No. PCT/JP2019/023328, filed on Jun. 12, 2019, the contents of which are incorporated herein by reference.

FIELD

The present invention relates to an air-conditioning control device that controls operations of a plurality of air conditioners and also relates to an air-conditioning control system.

BACKGROUND

In conventional buildings that have air conditioners installed, such as office buildings and commercial stores, remote controllers (hereinafter referred to as "remotes") that are used to operate the air conditioners are generally installed on walls and others. The user manually operates and stops the air conditioner by means of the remote. However, the user rarely operates the remote to change the air conditioner set temperature, for example, at times of an increase or decrease in the number of persons. The user usually adjusts the set temperature and others by means of the remote for restoring the impaired con don to a comfortable condition after noticing that it has become hot or cold. In addition, even when every person is away and there is no person in the room, the air conditioner keeps running unless the user stops the air conditioner by operating the remote, leading to a waste of energy.

As an air-conditioning control technique that keeps track of distribution of persons, Patent Literature 1 discloses a technique for an apparatus control device that obtains various information about persons, objects, and others in a room and transmits, by wireless communication, control signals, generated on the basis of indoor conditions, for indoor apparatuses installed in the room, thus controlling operations of the indoor apparatuses.

CITATION LIST

Patent Literature

Patent Literature 1: Japanese Patent No. 3048825

SUMMARY

Technical Problem

However, the apparatus control device described in Patent Literature 1 uses infrared radiation to wirelessly send the control signals in all directions to control the operations of the respective indoor apparatuses. Therefore, there is a problem in that even when there are a plurality of identical indoor apparatuses installed, the apparatus control device described in Patent Literature 1 can only provide the same control for the respective indoor apparatuses.

The present invention has been made in view of the above, and an object of the present invention is to provide an air-conditioning control device capable of providing air conditioning area-specific operation controls for a plurality of air conditioners.

Solution to Problem

In order to solve the above-mentioned problems and achieve the object, the present invention is an air-conditioning control device to control operation of a plurality of air conditioners. The air-conditioning control device includes: an air conditioner management unit to manage operating states of the air conditioners; an image analysis unit to analyze image information obtained from an image sensor and to ascertain a person in each of air conditioning areas, the air conditioners providing controlled air conditioning for the air conditioning areas; air-conditioning communication line connection units respectively for the air conditioning areas, the air-conditioning communication line connection units being connectable with air-conditioning communication lines, the air conditioners being connected to the air-conditioning communication lines; an air-conditioning communication line connection determination unit capable of determining whether or not each of the air conditioners is connected to a corresponding one of the air-conditioning communication line connection units via a corresponding one of the air-conditioning communication lines; and an air-conditioning control unit to provide, on a basis of number of persons in each of the air conditioning areas, air conditioning area-specific operation control for the air conditioners connected to the air-conditioning communication line connection units via the air-conditioning communication lines.

Advantageous Effect of Invention

The air-conditioning control device according to the present invention is capable of providing air conditioning area-specific operation controls for a plurality of air conditioners.

BRIEF DESCRIPTION OF DRAWINGS

FIG. 7 is a flowchart illustrating an operation on how the air-conditioning control device analyzes images captured by an image sensor, ascertains categories and locations of targets, and calculates radiation temperatures of the targets.

FIG. 8 is a flowchart illustrating an operation on how the air-conditioning control device provides the air conditioners with interlock control that depends on presence or absence of a person in each air conditioning area.

FIG. 9 is a flowchart illustrating an operation on how the air-conditioning control device provides the air conditioners with differentiated blowing control that depends on the location(s) of the person(s) in each air conditioning area.

FIG. 10 is a flowchart illustrating an operation on how the air-conditioning control device regulates, for the air conditioners, an air-conditioning control amount on the basis of heat quantities in each air conditioning area.

DESCRIPTION OF EMBODIMENT

An air-conditioning control device and an air-conditioning control system according to embodiments of the present invention will now be described in detail with reference to the drawings. Note that the present invention is not limited to the embodiments.

Embodiment

Figure 1:
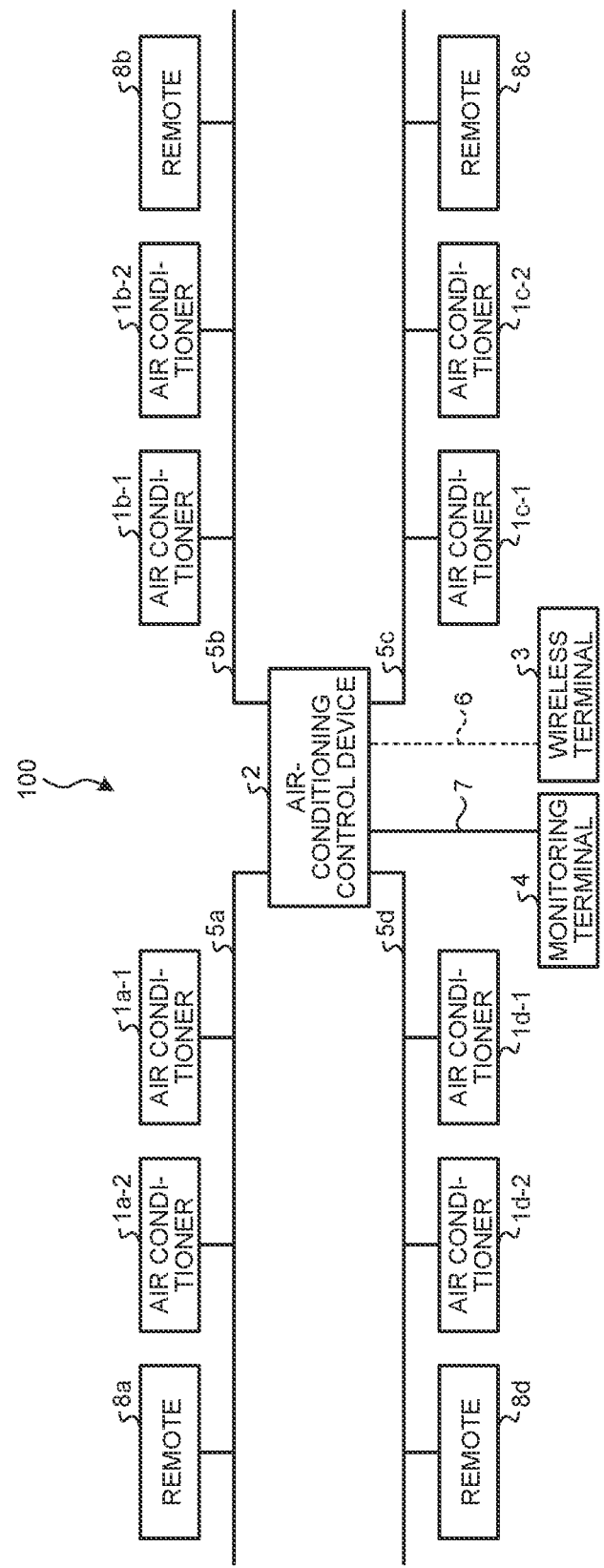
FIG. 1 is a diagram illustrating an example configuration of an air-conditioning control system.

FIG. 1 is a diagram illustrating an example configuration of an air-conditioning control system 100 according to an embodiment of the present invention. The air-conditioning control system 100 includes air conditioners 1a-1, 1a-2, 1b-1, 1b-2, 1c-1, 1c-2, 1d-1, and 1d-2, an air-conditioning control device 2, a wireless terminal 3, a monitoring terminal 4, and remotes 8a, 8b, 8c, and 8d. In the air-conditioning control system 100, the air-conditioning control device 2 controls operations of the air conditioners 1a-1, 1a-2, 1b-1, 1b-2, 1c-1, 1c-2, 1d-1, and 1d-2.

The air-conditioning control device 2, the air conditioners 1a-1 and 1a-2, and the remote 8a are communicatively connected via an air-conditioning communication line 5a. The air-conditioning control device 2, the air conditioners 1b-1 and 1b-2, and the remote 8b are communicatively connected via an air-conditioning communication line 5b. The air-conditioning control device 2, the air conditioners 1c-1 and 1c-2, and the remote 8c are communicatively connected via an air-conditioning communication line 5c. The air-condoning control device 2, the air conditioners 1d-1 and 1d-2, and the remote 8d are communicatively connected via an air-conditioning communication line 5d. In the descriptions below, the air conditioners 1a-1 and 1a-2 may be referred to as the air conditioners 1a when no distinction needs to be made, the air conditioners 1b-1 and 1b-2 may be referred to as the air conditioners 1b when no distinction needs to be made, the air conditioners 1c-1 and 1c-2 may be referred to as the air conditioners 1c when no distinction needs to be made, and the air conditioners 1d-1 and 1d-2 may be referred to as the air conditioners 1d when no distinction needs to be made. The air conditioners 1a, 1b, 1c, and 1d may be referred to as the air conditioners 1 when no distinction needs to be made. The air-conditioning communication lines 5a, 5b, 5c, and 5d may be referred to as the air-conditioning communication lines 5 when no distinction needs to be made, and the remotes 8a, 8b, 8c, and 8d may be referred to as the remotes 8 when no distinction needs to be made.

The air conditioners 1 are communicatively connected to the wireless terminal 3 via a wireless communication line 6. The wireless terminal 3 is any operation terminal that is connectable by wireless communication, such as a portable terminal or a tablet terminal. Bluetooth (registered trademark) Low Energy (BLE) is a non-limiting example of a type of wireless communication.

The air conditioners 1 are communicatively connected to the monitoring terminal 4 via a wire communication line 7. The monitoring terminal 4 is any monitoring terminal that is connectable by wire communication, such as a general-purpose computer or a building management system. A local area network (LAN) is a non-limiting example of a type of wire communication.

The air-conditioning control device 2 accepts operations from the wireless terminal 3 and the monitoring terminal 4 and provides integrated operation control and management for the plurality of air conditioners 1.

Each of the plurality of air conditioners 1 is installed at a designated location in a building. Each air conditioner 1 allows operation and monitoring by the air-conditioning control device 2. Each air conditioner 1 notifies the air-conditioning control device 2 of information on its operating state via the air-conditioning communication line 5.

In the air-conditioning control system 100 illustrated in FIG. 1, the air conditioners 1 connected each of the air-conditioning communication lines 5 are two in number; however, this is a non-limiting example. The air conditioners 1 connected to each air-conditioning communication line 5 may be one or three or more in number. In the air-conditioning control system 100 illustrated in FIG. 1, the remote 8 is connected to each air-conditioning communication line 5 to enable settings of the operating state of the air conditioners 1 connected to the air-conditioning communication line 5; however, this is a non-limiting example. The remotes 8 do not necessarily need to be connected to the air-condoning communication lines 5, respectively.

Figure 2:
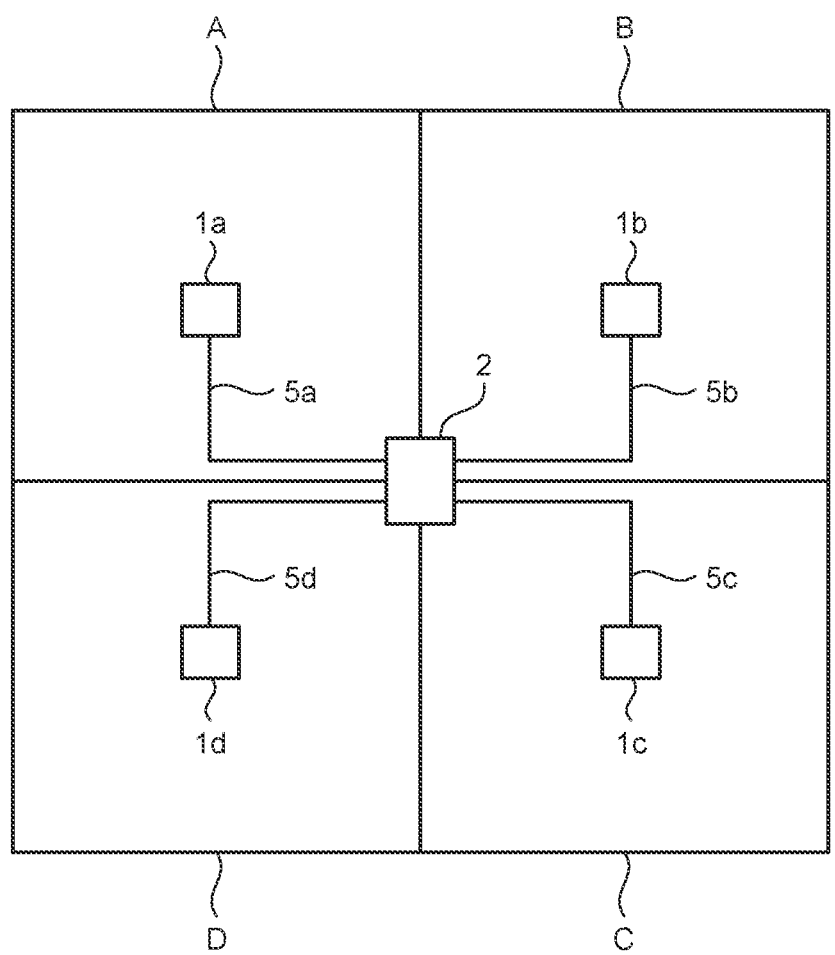
FIG. 2 is a diagram illustrating an example of layout of the air-conditioning control system.

FIG. 2 is a diagram illustrating an example of layout of the air-conditioning control system 100 according to the present embodiment. In the present embodiment, the air-conditioning control system 100 provides controlled air conditioning for four areas, for example. These areas to be subjected to the controlled air conditioning are referred to as the air conditioning areas A to D. As illustrated in FIG. 2, the conditioners 1a to 1d are installed in the air conditioning areas A to D to control air conditioning in the air conditioning areas A to D. In the example in FIG. 2, the air conditioners 1 are four in number and are centered about, or disposed about, the air-conditioning control device 2, which is installed on a ceiling surface. In the example in FIG. 2, one air conditioner 1 is connected to each air-conditioning communication line 5 for the sake of simple illustration. For the sake of simple illustration, FIG. 2 does not illustrate the wireless terminal 3 and the monitoring terminal 4.

Figure 3:
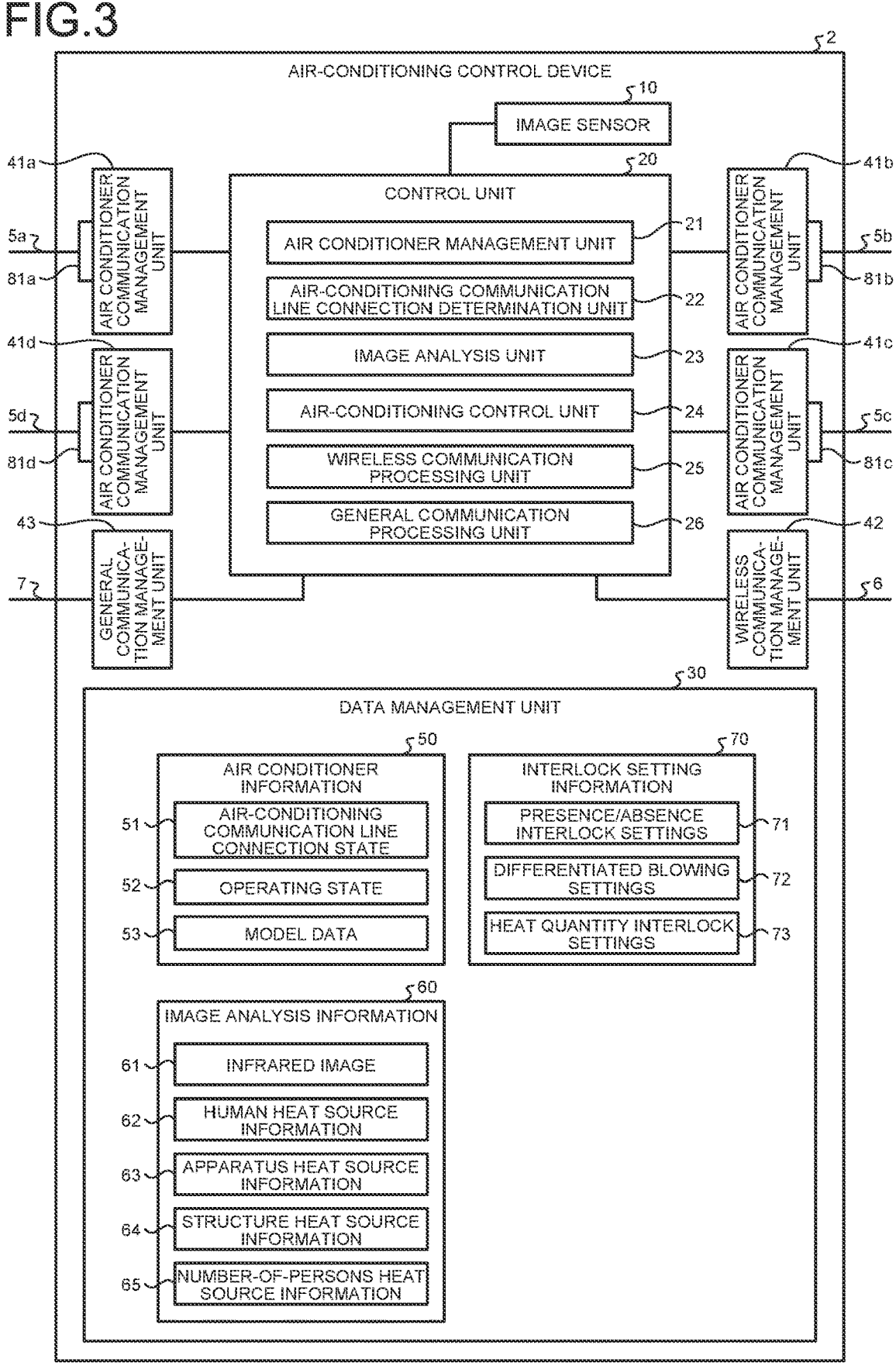
FIG. 3 is a block diagram illustrating an example configuration of an air-conditioning control device.

A description is given next of a configuration of the air-conditioning control device 2. FIG. 3 is a block diagram illustrating an example of the configuration of the air-conditioning control device 2 according to the present embodiment. The air-conditioning control device 2 includes an image sensor 10, a control unit 20, a data management unit 30, air conditioner communication management units 41a to 41d, a wireless communication management unit 42, a general communication management unit 43, and air-conditioning communication line connection units 81a to 81d.

The image sensor 10 is an infrared sensor that rotates to capture images around the air-conditioning control device 2 and transmits the captured images to the control unit 20. Because of being of an infrared type, the image sensor 10 is capable of distinguishing heat sources even in a dark room where light is insufficient for a visible camera. Although the image sensor 10 is described as being the infrared sensor, this is a non-limiting example. The image sensor 10 does not necessarily need to be an infrared sensor. The image sensor 10 to use may be a mechanism that distinguishes persons with a visible camera, depending on where the air-conditioning control system 100 is installed.

The control unit 20 retains the operating states of the plurality of air conditioners 1 connected to the air-conditioning control device 2, analyzes the images obtained from the image sensor 10 to ascertain the location(s) of the person(s), the number of persons, and others, and provides the air conditioners 1 with various air-conditioning controls such as energy-saving control and comfort control. Moreover, the control unit 20 generates data necessary for the wireless terminal 3 and the monitoring terminal 4 and performs data transmission and reception to and from the wireless terminal 3 and the monitoring terminal 4.

The control unit 20 includes an air conditioner management unit 21, an air-conditioning communication line connection determination unit 22, an image analysis unit 23, an air-conditioning control unit 24, a wireless communication processing unit 25, and a general communication processing unit 26. The air conditioner management unit 21 manages the operating states of the plurality of air conditioners 1 for which the air-conditioning control device 2 provides the air-conditioning controls. The air-conditioning communication line connection determination unit 22 determines whether or not the air conditioners 1 are being connected to the air-conditioning communication line connection units 81a to 81d via the air-conditioning communication lines 5. The image analysis unit 23 analyzes image information, namely, infrared images obtained from the image sensor 10 and ascertains any persons in each of the air conditioning areas for which the plurality of air conditioners 1 provide the controlled air conditioning. The image analysis unit 23 also ascertains any apparatuses in each air condoning area when analyzing the image information, namely, the infrared images obtained from the image sensor 10. The air-conditioning control unit 24 provides, for example, the energy-saving control for the air conditioners 1. The wireless communication processing unit 25 processes monitor commands, operation commands, and the like from the wireless terminal 3. The general communication processing unit 26 processes monitor commands, operation commands, and the like from the monitoring terminal 4.

The data management unit 30 manages various data that are needed when the air conditioners 1 are monitored or controlled, thermal image data obtained from the image sensor 10, and interlock setting data that is used in the controls of the air conditioners 1 on the basis of an increase or decrease in the number of persons. The data that the data management unit 30 manages are classified roughly into air conditioner information 50, image analysis information 60, and interlock setting information 70.

The air conditioner information 50 includes information on the air conditioners 1 under the management of the air-conditioning control device 2, such as an air-conditioning communication line connection state 51, an operating state 52 of each air conditioner 1, and model data 53.

The air-conditioning communication line connection state 51 refers to data indicating whether or not the air-conditioning communication lines 5a to 5d are being connected. The operating state 52 refers to data indicating the current operating state of each air conditioner 1. The operating state includes, for example, a working or stopped state, a mode of operation such as cooling or heating, set temperature, and room temperature. The operating state 52 is updated at any time through data transmission and reception between the air-conditioning control device 2 and the air conditioners 1. The model data 53 refers to various information on models of the air conditioners 1. For example, air conditioner types, air conditioner serial numbers, air conditioner model names, and a data list to be retained are retained as the model data 53.

The image analysis information 60 includes the collected image data and analysis results, or more specifically, the infrared images 61, human heat source information 62, apparatus heat source information 63, structure heat source information 61, and number-of-persons heat source information 65.

The infrared image 61 refers to a thermal image that is obtained by stitching images obtained by the rotating image sensor 10 performing the image capture multiple times. The infrared image 61 may be a 90-degree image of each air conditioning area or a 360-degree image obtained by stitching images captured in one rotation. The human heat source information 62 refers to data indicating results of analysis of the infrared images 61, such as locations and temperatures of persons and the number of persons in each air conditioning area. The temperature of a person refers to segmented data about a head, arms and legs, and others. The human heat source information 62 is updated at any time in response to analysis of the thermal image by the image analysis unit 23 after the image sensor 10 finishes capturing images of at least one of the air conditioning areas. The apparatus heat source information 63 refers to data indicating results of the analysis of the infrared images 61, such as locations and temperatures of the apparatuses, apparatus types, and the number of apparatuses in each air conditioning area. The apparatus types refer to identified heat radiating source types other than a person, such as a personal computer (hereinafter referred to as PC), a display, and a copying machine. The structure heat source information 64 refers to data indicating results of the analysis of the infrared images 61, such as locations, temperatures, and areas of structural parts, and structural part types. The structural part types refer to identified types of structural part of a building that are needed for calculation of quantities of heat radiating from the structural parts, such as a wall, a floor, and a window. The number-of-persons heat source information 65 refers to data indicating the number of persons in each air conditioning area obtained from the infrared images 61. When there is more than one person in one block, a count of a plurality of persons in each block is made.

The interlock setting information. 70 includes interlock information to use in association with the analysis results of the image analysis information 60 in the controls of the air conditioners 1, or more specifically, presence/absence interlock settings 71, differentiated blowing settings 72, and heat quantity interlock settings 73.

The presence/absence interlock settings 71 refer to information on interlock settings with the air conditioners 1, such as starting or stopping the air conditioners 1, blowing (thermo-off) operation, raising the set temperature, and lowering the set temperature, all of which depend on the number of persons in each air conditioning area. The differentiated blowing settings 72 refer to information on interlock settings that are used in control of the wind direction and speed of the air conditioners 1, depending on the locations of the persons recognized by the image sensor 10 and personal preferences that are registered in advance, such as indirect wind and direct wind. The heat quantity interlock settings 73 refer to information on interlock settings that are used in the air-conditioning controls, depending on heat quantities in each air conditioning area. The heat quantities are calculated on the basis of the number of persons, the number of apparatuses, and the temperatures of the structural parts, all of which are recognized by the image sensor 10. The heat quantity interlock settings 73 include setting information such as comfort-oriented setting information that is used to achieve air-conditioning amount=heat quantities and energy saving-oriented setting information that is used to achieve air-conditioning amount<heat quantities.

The air conditioner communication management units 41a to 41d are interfaces for the air-conditioning communication lines 5a to 5d. The air-conditioning control device 2 performs the data transmission and reception to and from the air conditioners 1a to 1d via the air conditioner communication management units 41a to 41d. Practically, the air-conditioning communication line 5a is connected to the air conditioner communication management unit 41a via the air-conditioning communication line connection unit 81a. Similarly, the air-conditioning communication line 5b is connected to the air conditioner communication management unit 41b via the air-conditioning communication line connection unit 81b, the air-conditioning communication line 5c is connected to the air conditioner communication management unit 41c via the air-conditioning communication line connection unit 81c, and the air-conditioning communication line 5d is connected to the air conditioner communication management unit 41d via the air-conditioning communication line connection unit 81d. Although the air-conditioning communication lines 5a to 5d are dedicated communication lines here, the air-conditioning communication lines 5a to 5d do not necessarily need to be the dedicated communication lines and may be general-purpose wire communication lines using, for example, the LAN or Recommended Standard 485 (RS-485) interfaces.

The wireless communication management unit 42 is an interface for the wireless communication line 6. The air-conditioning control device 2 performs the data transmission and reception to and from the wireless terminal 3 via the wireless communication management unit 42. The wireless communication line 6 may enable multiple types of wireless communication, such as Near-Field Communication (NFC), Bluetooth, BLE, and a wireless LAN.

The general communication management unit 43 is an interface for the wire communication line 7. The air-conditioning control device 2 performs the data transmission and reception to and from the monitoring terminal 4 via the general communication management unit 43. Instead of a communication line enabling the LAN communication, the wire communication line 7 may be a communication line that enables Universal Serial Bus (USB) wire communication, RS-485 wire communication, or any other wire communication.

The wireless terminal 3 is a terminal that communicates with the air-conditioning control device 2 via the wireless communication line 6 and is used for, for example, monitoring the operating states of the air conditioners 1, operating the air conditioners 1, viewing the image analysis information 60, and setting and monitoring the interlock setting information 70. The wireless terminal 3 is capable of wireless communication and is, for example, a tablet terminal or a smartphone. By executing a smartphone application, the wireless terminal 3 communicates with the air-conditioning control device 2 and performs, for example, setting and monitoring of various information.

The monitoring terminal 4 is a terminal that communicates with the air-conditioning control device 2 via the wire communication line 7 and is used for, for example, monitoring the operating states of the air conditioners 1, operating the air conditioners 1, viewing the image analysis information 60, and setting and monitoring the interlock setting information 70. Assumed examples of the monitoring terminal 4 include a PC and a building management system. The monitoring terminal 4 communicates with the air-conditioning control device 2, performs, for example, setting and monitoring of various information, and is capable of information analysis for, for example, providing interlock controls for the air conditioners 1.

Figure 4:
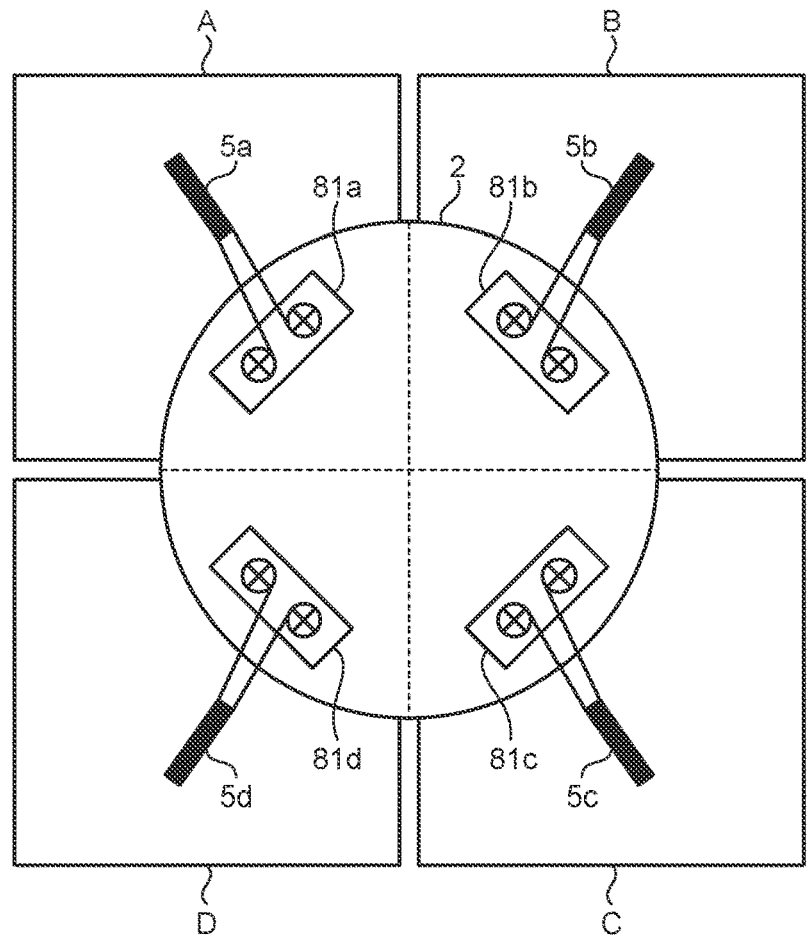
FIG. 4 is a diagram illustrating a relationship between an arrangement of air-conditioning communication line connection units of the air-conditioning control device and air conditioning areas.

FIG. 4 is a diagram illustrating a relationship between an arrangement of the air-conditioning communication line connection units 81a to 81d of the air-conditioning control device 2 according to the present embodiment and the air conditioning areas. The air-conditioning communication line connection units 81a to 81d are connectable respectively with the air-conditioning communication lines 5 to which the air conditioners 1 are connected. The air-conditioning control device 2 has the air-conditioning communication line connection units 81a to 81d corresponding respectively to the air conditioning areas. As illustrated in FIG. 4, the air-conditioning communication line connection units 81a to 81d of the air-conditioning control device 2 are positioned respectively in respective directions of the air conditioning areas A to D, which are centered about, or arranged about, the installation position of the air-conditioning control device 2. The air-conditioning communication lines 5a to 5d are connected to the air-conditioning communication line connection units 81a to 81d, respectively. It is assumed that, for example, the air conditioners 1 that are connected to the air-conditioning communication line 5a connected to the air-conditioning communication line connection unit 81a are installed in the air conditioning area A, and the air-conditioning control device 2 monitors and controls these air conditioners 1. Similarly, it is assumed that the air conditioners 1 that are connected to the air-conditioning communication line 5b connected to the air-conditioning communication line connection unit 81b are installed in the air conditioning area B, and the air-conditioning control device 2 monitors and controls these air conditioners 1. It is assumed that the air conditioners 1 that are connected to the air-conditioning communication line 5c connected to the air-conditioning communication line connection unit 81c are installed in the air conditioning area C, and the air-conditioning control device 2 monitors and controls these air conditioners 1. It is assumed that the air conditioners 1 that are connected to the air-conditioning communication line 5d connected to the air-conditioning communication line connection unit 81d are installed in the air condoning area D, and the air-conditioning control device 2 monitors and controls these air conditioners 1.

The air-conditioning communication line connection units 81a to 81d are independent terminal blocks or connectors. Since the air-condoning communication line connection units 81a to 81d are disposed respectively in the respective directions of the air conditioning areas, the air-conditioning control device 2 is capable of automatically ascertaining which air conditioning area corresponds to the image capture direction of the image sensor 10 without settings by persons.

Figure 5:
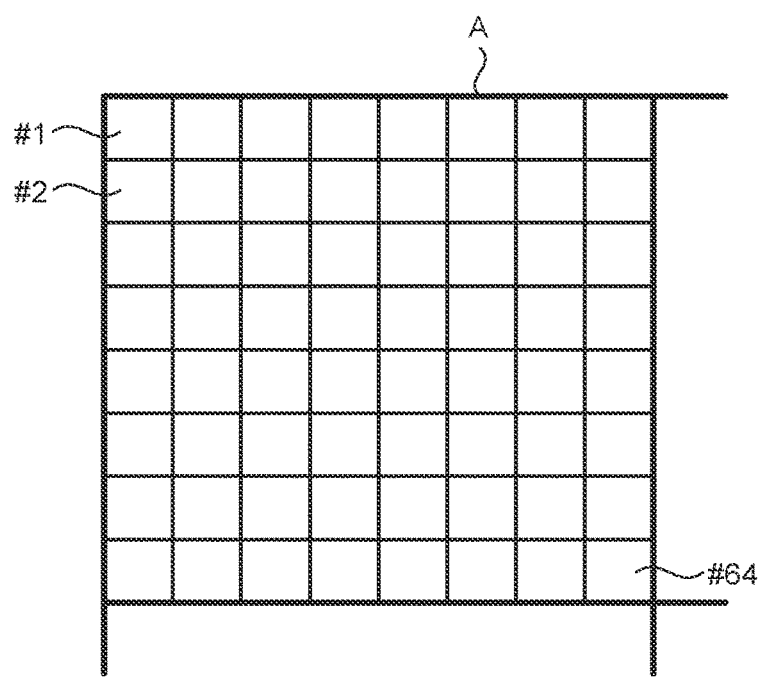
FIG. 5 is a diagram illustrating resolution of locations of persons and apparatuses in each of the air conditioning areas to be controlled by the air-conditioning control device.

FIG. 5 is a diagram illustrating resolution of locations of persons and apparatuses in each air conditioning area to be controlled by the air-conditioning control device 2 according to the present embodiment. Since the resolutions for the air conditioning areas A to D are the same, the air conditioning area A is described as an example here. As illustrated in FIG. 5, the air conditioning area A is divided into 64 blocks #1 to #64. The air-conditioning control device 2 is capable of analyzing, for output, whether the type of the heat source in each block is a person, an apparatus, or a structural part and what the temperature of each heat source is. As for the number of persons and the number of apparatuses, the air-conditioning control device 2 is capable of outputting the number of persons and the number of apparatuses in the entire air conditioning area because the presence of multiple persons and/or apparatuses in one block is conceivable.

In FIG. 5, the air conditioning area A is divided into 64 blocks; however, this is a non-limiting example. The number of blocks into which the air conditioning area A is divided may be more than or less than 64 as long as the heat source analysis is enabled. The number of blocks may be changed according to an area of the air conditioning area A.

Figure 6:
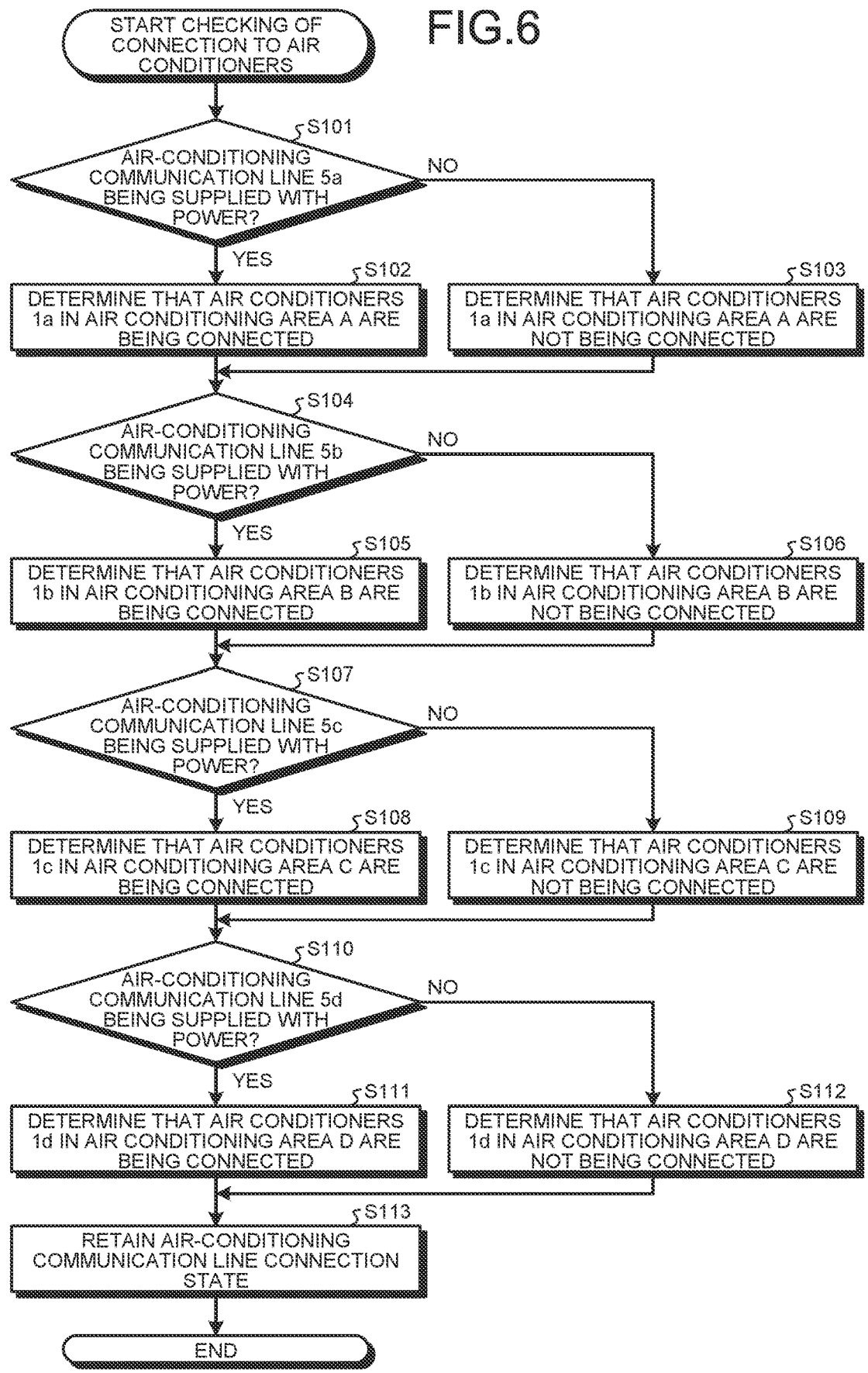
FIG. 6 is a flowchart illustrating an operation on how the air-conditioning control device ascertains air conditioners that are being connected.

A description is given next of operations of the air-conditioning control device 2. How the air-conditioning control device 2 ascertains the connected air conditioners 1 described first. FIG. 6 is a flowchart illustrating an operation on how the air-conditioning control device 2 according to the present embodiment ascertains the air conditioners 1 that are being connected.

As mentioned above, the air-conditioning control device 2 is connected to the air conditioners 1 via the air-conditioning communication line 5. The air-conditioning control device 2 applies constant voltage to the air-conditioning communication line 5 and transmits a communication command superimposed on the voltage, thus providing the air-conditioning control for the air conditioners 1. The air-conditioning communication line connection determination unit 22 of the air-conditioning control device 2 starts checking the connection to the air conditioners 1 at initial startup of the air-conditioning control device 2 or at a specified timing.

The air-conditioning communication line connection determination unit 22 determines whether or not the air-conditioning communication line 5a is being supplied with power, that is to say, whether or not the voltage is being applied (step S101). If the air-conditioning communication line 5a is being supplied with the power (step S101: Yes), the air-conditioning communication line connection determination unit 22 determines that the air conditioners 1a in the air conditioning area A are being connected (step S102). If the air-conditioning communication line 5a is not being supplied with the power (step S101: No), the air-conditioning communication line connection determination unit 22 determines that the air conditioners 1a in the air conditioning area A are not being connected (step S103).

The air-conditioning communication line connection determination unit 22 determines whether or not the air-conditioning communication line 5b is being supplied with power, that is to say, whether or not the voltage is being applied (step S104). If the air-conditioning communication line 5b is being supplied with the power (step S104: Yes), the air-conditioning communication line connection determination unit 22 determines that the air conditioners 1b in the air conditioning area B are being connected (step S105). If the air-conditioning communication line 5b is not being supplied with the power (step S104: No), the air-conditioning communication line connection determination unit 22 determines that the air conditioners 1b in the air conditioning area B are not being connected (step S106).

The air-conditioning communication line connection determination unit 22 determines whether or not the air-conditioning communication line 5c is being supplied with power, that is to say, whether or not the voltage is being applied (step S107). If the air-conditioning communication line 5c is being supplied with the power (step S107: Yes), the air-conditioning communication line connection determination unit 22 determines that the air conditioners 1c in the air conditioning area C are being connected (step S108). If the air-conditioning cormunication line 5c is not being supplied with the power (step S107: No), the air-conditioning communication line connection determination unit 22 determines that the air conditioners 1c in the air conditioning area C are not being connected (step S109).

The air-conditioning communication line connection determination unit 22 determines whether or not the air-conditioning cormunication line 5d is being supplied with power, that is to say, whether or not the voltage is being applied (step S110). If the air-conditioning communication line 5d is being supplied with the power (step S110: Yes), the air-conditioning communication line connection determination unit 22 determines that the air conditioners 1d in the air conditioning area D are being connected (step S111). If the air-conditioning communication line 5d is not being supplied with the power (step S110: No), the air-conditioning communication line connection determination unit 22 determines that the air conditioners 1d in the air conditioning area D are not being connected (step S112).

As described above, the air-conditioning communication line connection determination unit 22 determines that the air conditioners 1 are being connected to the air-conditioning communication line connection units 81a to 81d via the air-conditioning communication lines 5 when the air-conditioning communication lines 5 are being supplied with the power respectively via the air-conditioning communication line connection units 81a to 81d. As the air-conditioning communication line connection determination unit 22 finishes checking the connection to the air conditioners 1a to 1d for all the air conditioning areas, the air-conditioning communication line connection determination unit 22 causes the data management unit 30 to retain its determination results as the air-conditioning communication line connection state 51 (step S113).

When the air-conditioning communication lines 5a to 5d are connected to the air-conditioning control device 2, the air-conditioning control device 2 ascertains the connected air conditioners 1a to 1d through the above process, thus being capable of determining which air conditioning area among the air conditioning areas A to D has the connected air conditioners 1. By determining the presence or absence of the air conditioners 1 in each of the air conditioning areas A to D, the air-conditioning control device 2 can control the image sensor 10 such that the image sensor 10 does not capture images in the direction of the air conditioning area where the air conditioners 1 are not being connected when rotating to capture images. For example, the air-conditioning control device 2 can achieve a shorter image capture cycle by reversing the rotation direction of the image sensor 10 when the image capture direction of the image sensor 10 coincides with the direction of the air conditioning area where the air conditioners 1 are not being connected. Therefore, changes in persons are detectable at shorter intervals.

In the present embodiment, the air-conditioning communication line connection determination unit 22 checks the connection of the air-conditioning communication lines 5 at the startup of the air-conditioning control device 2 or at the specified timing; however, these timings are non-limiting examples. As long as the air-conditioning control device 2 can detect the connected air-conditioning communication lines 5, the air-conditioning communication line connection determination unit 22 may check the connection of the air-conditioning communication lines 5a to 5d at timings when the air-conditioning communication lines 5 are connected.

In the present embodiment, the air-conditioning communication line connection determination unit 22 determines the presence or absence of the connection by checking the voltage being applied; however, this is a non-limiting example. The air-conditioning communication line connection determination unit 22 may determine the presence or absence of the connection on the basis of the presence or absence of a response to a communication command sent to the air conditioner 1. This method is usable even in an air-conditioning communication system in which the air-conditioning communication lines 5 can perform communication without voltage.

A description is given next of how the air-conditioning control device 2 ascertains targets such as persons and PCs from images captured by the image sensor 10. FIG. 7 is a flowchart illustrating an operation on how the air-conditioning control device 2 according to the present embodiment analyzes the images captured by the image sensor 10, ascertains categories and locations of the targets, and calculates radiation temperatures of the targets.

The image analysis unit 23 of the air-conditioning control device 2 refers to the air-conditioning communication line connection state 51 retained in the data management unit 30 to determine whether or not there is any connected air-conditioning communication line 5 that corresponds to the air conditioning area where the image sensor 10 has performed the image capture (step S201). If there is no connected air-conditioning communication line 5 that corresponds to the air conditioning area where the image sensor 10 has performed the image capture (step S201: No), the image analysis unit 23 ends the process. If there is any connected air-conditioning communication line 5 corresponding to the air conditioning area where the image sensor 10 has performed the image capture (step S201: Yes), the image analysis unit 23 proceeds to step S202.

The image sensor 10 captures an image, for example, at every one-degree rotation. After 90-degree rotation, the image sensor 10 completes 90-degree image capture of one of the air conditioning areas and outputs infrared images. When the infrared images are input from the image sensor 10 (step S202), the image analysis unit 23 performs image corrections such as distortion correction and noise correction on the input infrared images (step S203) to make the images ready for analysis. The image analysis unit 23 causes the corrected thermal images to be retained as the infrared image 61 in the data management unit 30.

The image analysis unit 23 identifies the categories of the targets in the infrared image 61 (step S204). The image analysis unit 23 identifies the targets on the basis of the differences in quantity of infrared radiation from the targets. The targets are, for example, persons, walls, floors, windows, PCs, displays, and copying machines. The image analysis unit 23 may identify the target categories from the shapes in the thermal image, from the difference images relative to previously retained background images, or from variations obtained by comparison of multiple images captured in a fixed time period. The image analysis unit 23 causes the data management unit 30 to retain information on the persons as the human heat source information 62, information on the apparatuses, such as the PCs, as the apparatus heat source information 63, and information on the structural parts, such as the walls, as the structure heat source information 64, among the targets in the identified categories.

The image analysis unit 23 calculates the distance between each of the captured targets and the air-conditioning control device 2 on the basis of the image capturing position, the image capturing angle, and others of the image sensor 10 during the infrared image capture (step S205). The image analysis unit 23 causes the human heat source information 62, the apparatus heat source information 63, or the structure heat source information 64 of the corresponding target to retain information on the calculated distance to the target. If the height of the target is constant, the image analysis unit 23 calculates the distance, using a coordinate position on the infrared image 61. When, for example, the target is seen in a different position even at the same distance in the infrared image 61 because of being at a different height as in case of the person sitting down or standing up, the image analysis unit 23 compares multiple images captured at fixed time intervals, corrects the height of the target, and calculates the distance.

On the basis of the calculated distance between the air-conditioning control device 2 and the target, the image analysis unit 23 identifies which block in each air conditioning area the target is located in, that is to say, the block where the target is present. The image analysis unit 23 calculates the temperature of the target in each block from, for example, quantities of infrared radiation from the target or infrared emissivities (step S206). The image analysis unit 23 causes the human heat source information 62, the apparatus heat source information 63, or the structure heat source information 64 of the corresponding target to retain information on the block where the target is present and information on the temperature of the target in each block.

In order to calculate the quantities of heat radiating from the walls and the floors that are the structural parts in the air conditioning areas and the quantities of solar heat radiating from the windows, the image analysis unit 23 calculates, from the infrared images 61, an area of each of the structural parts among the targets (step S207). The image analysis unit 23 causes the structure heat source information 64 to retain information on the calculated area of each structural part.

The image analysis unit 23 calculates the number of persons in each air conditioning area on the basis of the human heat source information 62 (step S208). The image analysis unit 23 causes the data management unit 30 to retain information on the calculated number of persons in each air conditioning area as the number-of-persons heat source information 65.

Through the above process, the air-conditioning control device 2 can identify, from the infrared images captured by the image sensor 10, what type of target is present in which location in each air conditioning area, the temperatures of the targets, the areas of the structural parts, and the other information, and retain and output the identified information as the image analysis information 60. This process enables the air-conditioning control device 2 to perform the air-conditioning controls while taking into consideration the locations of the persons, the number of persons, the quantities of heat from the structural parts, and the like, meaning that various controls such as the energy-saving control and the comfort control are possible.

In the present embodiment, the air-conditioning control device 2 causes the image sensor 10 to capture the infrared images while rotating in order to obtain data on images of wide areas; however, the image sensor 10 does not necessarily need to be configured to rotate. The image sensor 10 of the air-conditioning control device 2 may be configured to perform image capture without rotating, for example, by narrowing the area to capture images, by increasing the size as an infrared sensor, or by using a fisheye lens.

In the present embodiment, each air conditioning area is a 90-degree area; however, the air conditioning areas do not necessarily need to be the 90-degree divisions. The air conditioning area may be changed to, for example, a 60-degree area, a 120-degree area, or a 360-degree area, depending on the timing of the infrared image analysis in the air-conditioning control device 2.

In the present embodiment, the number of blocks in the air conditioning area is 64 but does not necessarily need to be 64. As long as the size of the block is such that the target can be ascertained, the number of blocks may be less than or more than 64.

In the present embodiment, the air-conditioning control device 2 first checks the connection of the air-conditioning communication lines 5. The image sensor 10 may be set not to originally capture images of the air conditioning area having the air-conditioning communication line 5 unconnected.

A description is given next of how the air-conditioning control device 2 controls the air conditioners 1 on the basis of the image analysis information 60. FIG. 8 is a flowchart illustrating an operation on how the air-conditioning control device 2 according to the present embodiment provides the air conditioners 1 with the interlock control that depends on the presence or absence of the person(s) in each air conditioning area. The air-conditioning control unit 24 of the air-conditioning control device 2 starts the operation when the setting information is specified in the presence/absence interlock settings 71.

The air-conditioning control unit 24 refers to the air-conditioning communication line connection state 51 retained in the data management unit 30 to determine whether or not there is a connected air-conditioning communication line 5 that corresponds to the air conditioning area where the image sensor 10 has performed the image capture (step S301). In other words, the air-conditioning control unit 24 determines which air conditioning area has the connected air conditioners 1 on the basis of the determination results of the air-conditioning communication line connection determination unit 22. If there is no connected air-conditioning communication line 5 that corresponds to the air conditioning area where the image sensor 10 has performed the image capture (step S301: No), the air-conditioning control unit 24 ends the process. If there is a connected air-conditioning communication line 5 corresponding to the air conditioning area where the image sensor 10 has performed the image capture (step S301: Yes), the air-conditioning control unit 24 obtains the information on the number of persons in each air conditioning area from the number-of-persons heat source information 65 (step S302).

The air-conditioning control unit 24 determines whether or not there is an air conditioning area where the number of persons has changed from zero to one or more (step S303). If there is an air conditioning area where the number of persons has changed from zero to one or more (step S303: Yes), the air-condoning control unit 24 starts the air conditioners 1 in the corresponding air conditioning area (step S304). If there is no air conditioning area where the number of persons has changed from zero to one or more (step S303: No), the air conditioning control unit 24 proceeds to step S305.

The air-conditioning control unit 24 determines whether or not there is an air conditioning area where the number of persons has changed from one or more to zero (step S305). If there is an air conditioning area where the number of persons has changed from one or more to zero (step S305: Yes), the air-condoning control unit 24 stops the air conditioners 1 in the corresponding air conditioning area (step S306). If there is no air conditioning area where the number of persons has changed from one or more to zero (step S305: No), the air-conditioning control unit 24 ends the process.

Through the above process, the air-conditioning control device 2 provides the air conditioners 1 in each air conditioning area with the air conditioning area-specific control that depends on the presence or absence of the person(s) in the air conditioning area. This process enables energy saving since the air-conditioning control device 2 stops the air conditioners 1 in the air conditioning area where there is no person.

In the present embodiment, the air-conditioning control device 2 performs the interlock control that starts or stops the air conditioners 1; however, this is non-limiting. The air-conditioning control device 2 may provide controls other than starting or stopping the air conditioners 1, such as blowing (thermo-off) operation, raising the set temperature, and lowering the set temperature. In other words, on the basis of the determination results of the air-conditioning communication line connection determination unit 22, the air-conditioning control unit 24 may operate the air conditioners 1 that provides the controlled air conditioning for the air conditioning area where there is no person, in an energy-saving operation mode that enables reduced energy consumption compared with a normal operation mode. The detailed interlock control settings are included in the presence/absence interlock settings 71. As for the detailed interlock control settings, a manufacturer of the air-conditioning control system 100 may initially set the presence/absence interlock settings 71, or users may set the presence/absence interlock settings 71 or modify the initial settings.

FIG. 9 is a flowchart illustrating an operation on how the air-conditioning control device 2 according to the present embodiment provides the air conditioners 1 with differentiated blowing control that depends on the location(s) of the person(s) in each air conditioning area. The air-conditioning control unit 24 of the air-conditioning control device 2 starts the operation when the setting information is specified in the differentiated blowing settings 72.

The air-conditioning control unit 24 refers to the air-conditioning communication line connection state 51 retained in the data management unit 30 to determine whether or not there is a connected air-conditioning communication line 5 that corresponds to the air conditioning area where the image sensor 10 has performed the image capture (step S401). If there is no connected air-conditioning communication line 5 that corresponds to the air conditioning area where the image sensor 10 has performed the image capture (step S401: No), the air-conditioning control unit 24 ends the process. If there is a connected air-conditioning communication line 5 corresponding to the air conditioning area where the image sensor 10 has performed the image capture (step S401: Yes), the air-conditioning control unit 24 obtains the information on the locations of the persons in each air conditioning area from the human heat source information 62 (step S402) and obtains the information on the locations of the apparatuses in each air condoning area from the apparatus heat source information 63 (step S403).

The air-conditioning control unit 24 performs direct or indirect wind control for the person(s) on the basis of the differentiated blowing settings 72 (step S404). When, for example, the indirect wind for the person(s) is specified, the air-conditioning control unit 24 provides the air conditioners 1 in the corresponding air conditioning area with the wind direction control that changes a wind direction to provide a controlled indirect wind for the person(s). When the direct wind for person(s) is specified, the air-conditioning control unit 24 provides the air conditioners 1 in the corresponding air conditioning area with the wind direction control that changes the wind direction to provide a controlled direct wind for the person(s).

In the differentiated blowing settings 72, the settings for the direct wind and for the indirect wind may each be the same for everyone in each air conditioning area or may be individual-specific, namely, individual location-specific. The individual-specific settings in the differentiated blowing settings 72 may be performed not only by the monitoring terminal 4 but also by the individuals' wireless terminals 3 individually.

On the basis of the differentiated blowing settings 72, the air-conditioning control unit 24 provides the area around the apparatus(es) with a controlled direct wind by causing the air conditioners 1 in the corresponding air conditioning area to change the wind directions (step S405). The air-conditioning control device 2 provides the air conditioners 1 in the corresponding air conditioning area with the wind direction control that changes the wind direction to provide the controlled direct wind for the area around the apparatus(es). This enables prevention of impaired comfort that cannot be ascertained from a room temperature around the air conditioners 1 as in cases where it gets hot near the copying machine and other apparatuses.

In the differentiated blowing settings 72, the settings for whether or not to provide the direct wind may be the same for all the apparatuses or may be apparatus-specific, namely, apparatus location-specific. The apparatus-specific settings in the differentiated blowing settings 72 may be performed not only by the monitoring terminal 4 but also by the individuals' wireless terminals 3 individually.

Through the above process, the air-conditioning control device 2 causes the direct wind or the indirect wind to be provided for the person(s) in each air conditioning area and causes the direct wind to be provided for the apparatus(es) in each air conditioning area. This process enables the air-conditioning control device 2 to provide comfort, for example, by preventing exposure of the person(s) to the direct wind and preventing the area near the copying machine or any other apparatus from getting hot.

FIG. 10 is a flowchart illustrating an operation on how the air-conditioning control device 2 according to the present embodiment regulates, for the air conditioners 1, an air-conditioning control amount on the basis of heat quantities in each air conditioning area. The air-conditioning control unit 24 of the air-conditioning control device 2 starts the operation when the setting information is specified in the heat quantity interlock settings 73.

The air-conditioning control unit 24 refers to the air-conditioning communication line connection state 51 retained in the data management unit 30 to determine whether or not there is a connected air-conditioning communication line 5 that corresponds to the air conditioning area where the image sensor 10 has performed the image capture (step S501). If there is no connected air-conditioning communication line 5 that corresponds to the air conditioning area where the image sensor 10 has performed the image capture (step S501: No), the air-conditioning control unit 24 ends the process. If there is a connected air-conditioning communication line 5 corresponding to the air conditioning area where the image sensor 10 has performed the image capture (step S501: Yes), the air-conditioning control unit 24 proceeds to the next step.

The air-conditioning control unit 24 obtains the information on the number of persons in each air conditioning area from the number-of-persons heat source information 65 and calculates a quantity of heat from the persons (step S502).

The air-conditioning control unit 24 obtains the information on the apparatuses in each air conditioning area from the apparatus heat source information 63 and calculates a quantity of heat from the apparatuses (step S503).

The air-conditioning control unit 24 obtains the information on the structural parts in each air conditioning area from the structure heat source information 64 and calculates a quantity of heat radiating from the structural parts (step S504).

On the basis of the heat quantity interlock settings 73, the air-conditioning control unit 24 performs air-conditioning controls that each correspond to a heat requirement based on the calculated heat quantities (step S505). The heat requirement is a heat quantity obtained by adding up the calculated quantity of heat from the persons, the calculated quantity of heat from the apparatuses, and the calculated quantity of heat radiating from the structural parts. Specifically, the air-conditioning control unit 24 varies, for example, the blowing temperatures, wind speeds, and set temperatures of the air conditioners 1 in the corresponding air conditioning areas. As described above, the air-conditioning control unit 24 calculates the quantity of heat from the persons and the quantity of heat from the apparatuses in each air conditioning area and, on the basis of the calculated heat quantities, controls the operations of the air conditioners 1 in each air conditioning area to be controlled.

The control information pieces that are used in association with the varying heat quantity may be set not only by the monitoring terminal 4 but also by the individuals wireless terminals 3 individually.

Through the above process, the air-conditioning control device 2 controls the air conditioners 1 before the room temperature changes due to a variation in the heat quantities from the person, the apparatuses, and the structural parts. This process enables the air-conditioning control device 2 to prevent impaired comfort. As illustrated in FIGS. 8 to 10, on the basis of the number of persons in each air conditioning area, the air-conditioning control unit 24 provides the air conditioning area-specific operation controls for the plurality of air conditioners 1 connected to the air-conditioning communication line connection units 81a to 81d via the air-conditioning communication lines 5.

According to the present embodiment as described above, the air-conditioning control device 2 includes the air-conditioning communication line connection units 81a to 81d that connect to the air conditioners 1 via the air-conditioning communication lines 5, analyzes the images from the image sensor 10 to ascertain the location(s) of the person(s) and the number of persons, and is capable of providing the plurality of air conditioners with the controls based on the different operation details. Therefore, the air-conditioning control device 2 is capable of providing the air conditioners 1 connected to the plurality of air-conditioning communication lines 5 with the energy-saving or comfort control that is based on the varying heat quantity reflecting the location(s) of the person(s) and the number of persons in each of the plurality of air conditioning areas. The air-conditioning control device 2 is capable of providing the plurality of air conditioners 1 with the air conditioning area-specific operation controls that are based on the different control details without a person operating the remote 8.

The air-conditioning control device 2 according to the present embodiment has the air-conditioning communication line connection units 81a to 81d, which connect respectively with the air-conditioning communication lines 5 for controlling the air conditioners 1, disposed respectively in the plurality of directions to ascertain that the areas each having the corresponding air conditioners 1 coincide in direction with the air-conditioning communication line connection units 81a to 81d, respectively. In this way, the air-conditioning control device 2 automatically ascertains each positional relationship between the air conditioning area where the image sensor 10 has performed the image capture and the air conditioners 1; therefore, it is possible to eliminate the need for an operator who sets the relationship between the image capture area and the air conditioners 1.

Even when connected to only two of the air-conditioning communication lines 5, the air-conditioning control device 2 according to the present embodiment is capable of determining whether or not the air-conditioning communication lines 5 are being connected by determining whether or not the air-conditioning communication lines 5 are being supplied with the power. Therefore, the air-conditioning control device 2 is capable of achieving a shorter rotation time and a shorter detection time by causing the image sensor 10 to perform the image capture only in the directions of the air conditioning areas each having the air-conditioning communication line 5 connected and, for example, skip the air conditioning areas each having the air-conditioning communication line 5 unconnected so that the image capture is not performed in the directions of the skipped air conditioning areas.

The air-conditioning control device 2 according to the present embodiment is capable of ascertaining the number of persons in each air conditioning area. Therefore, the air-conditioning control device 2 is capable of the air-conditioning control that improves energy saving performance, such as providing no air conditioning for the air conditioning area where there is no person or turning down the air-conditioning in the air conditioning area where there is no person.

The air-conditioning control device 2 according to the present embodiment is capable of ascertaining the categories and locations of the persons, the apparatuses, and the others by looking down at the air conditioning areas in the actual room. Therefore, the air-conditioning control device 2 is capable of the comfort enhancing control that, for example, prevents a temperature rise around the person(s) by preventing exposure of the person(s) to the wind and providing the wind for the heat source(s).

The air-conditioning control device 2 according to the present embodiment is capable of calculating the heat quantities in each air conditioning area. Therefore, the air-conditioning control device 2 is capable of performing the control that prevents, for example, a temperature rise for maintaining comfort, by performing the air-conditioning control before the room temperature changes in each air conditioning area.

The air-conditioning control device 2 according to the present embodiment is capable of recognizing the persons in a large area compared with a typical motion sensor by rotating the image sensor 10. With the increased detection area, the air-conditioning control system 100 enables reduced system cost, for example, by installing only a single air-conditioning control device 2 according to the present embodiment for four air conditioners.

The air-conditioning control device 2 according to the present embodiment can analyze the images captured by the image sensor 10, classify the targets into the persons, the apparatuses, and the structural parts, and ascertain the targets from block to block in the single air conditioning area, which is divided into the 64 blocks. Therefore, the air-conditioning control device 2 is capable of readily ascertaining what type of heat source is present in which location in the air conditioning area and thus is capable of performing various controls such as the energy-saving control and the comfort control.

The air-conditioning control system 100 according to the present embodiment has the air-conditioning control device 2 and the air conditioners 1 connected to the same air-conditioning communication line 5 as that connected to the remote 8. This enables the air-condoning control device 2 and the remote 8 to be equally recognized by the air conditioners 1 in the air-conditioning control system 100; therefore, operation functions of the remote 8 remain available. Accordingly, the air-conditioning control system 100 can be readily introduced to an existing property without any alterations to software of the air conditioners 1.

Figure 11:
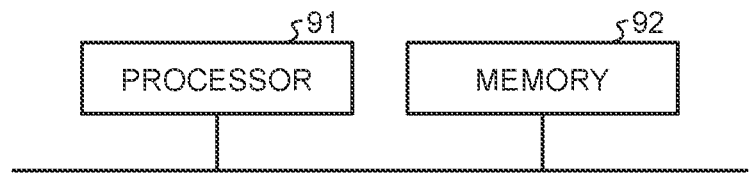
FIG. 11 is a diagram illustrating an example of processing circuitry of the air-conditioning control device.

A description is given next of a hardware configuration of the air-conditioning control device 2. FIG. 11 is a diagram illustrating an example of processing circuitry of the air-conditioning control device 2 according to the present embodiment. The image sensor 10 of the air-conditioning control device 2 is a sensor that detects infrared radiation. The air conditioner communication management units 41a to 41d are interfaces that provide communication with the air conditioners 1. The general communication management unit 43 is an interface that provides communication with the monitoring terminal 4. The air-conditioning communication line connection units 81a to 81d are, for example, independent terminal blocks or connectors. The wireless communication management unit 42 is an interface that provides communication with the wireless terminal 3. The data management unit 30 is a memory. The control unit 20 is implemented with the processing circuitry. For example, the processing circuitry includes a memory 92 and a processor 91 that executes programs stored in the memory 92.

When the processing circuitry includes the processor 91 and the memory 92, the processing circuitry is functionally implemented by software, firmware, or a combination of software and firmware. The software or the firmware is described as programs and is stored in the memory 92. In the processing circuitry, the processor 91 reads and executes the programs stored in the memory 92 for functional implementations. These programs can be said to cause a computer to execute the procedures and the methods related to the air-conditioning control device 2.

The processor 91 here may be, for example, a central processing unit (CPU), a processing unit, an arithmetic unit, a microprocessor, a microcomputer, or a digital signal processor (DSP). The memory 92 corresponds to, for example, a nonvolatile or volatile semiconductor memory such as a random-access memory (RAM), a read-only memory (ROM), a flash memory, an erasable programmable ROM (EPROM), or an electrically EPROM (EEPROM) (registered trademark), a magnetic disk, a flexible disk, an optical disk, a compact disk, a mini disk, or a digital versatile disc (DVD).

The processing circuitry may be dedicated hardware. When the processing circuitry is the dedicated hardware, the processing circuitry corresponds to, for example, a single circuit, a composite circuit, a programmed processor, a parallel programmed processor, an application-specific integrated circuit (ASIC), a field-programmable gate array (FPGA), or a combination of these. Those functions of the air-conditioning control device 2 may be implemented individually or collectively with the processing circuitry.

Some of the functions of the air-conditioning control device 2 may be implemented with dedicated hardware, while some of the other functions may be implemented with software or firmware. By including the dedicated hardware, the software, the firmware or a combination of these, the processing circuitry is capable of the above functional implementations.

The above configurations illustrated in the embodiment are illustrative of contents of the present invention, can be combined with other techniques that are publicly known, and can be partly omitted or changed without departing from the gist of the present invention.

REFERENCE SIGNS LIST 1a, 1a-1, 1a-2, 1b, 1b-1, 1b-2, 1c, 1c-1, 1c-2, 1d, 1d-1, 1d-2 air conditioner; 2 air-conditioning control device; 3 wireless terminal; 4 monitoring terminal; 5a to 5d air-conditioning communication line; 6 wireless communication line; 7 wire communication line; 8a to 8d remote; 10 image sensor; 20 control unit; 21 air conditioner management unit; 22 air-conditioning communication line connection determination unit; 23 image analysis unit; 24 air-conditioning control unit; 25 wireless communication processing unit; 26 general communication processing unit; 30 data management unit; 41a to 41d air conditioner communication management unit; 42 wireless communication management unit; 43 general communication management unit; 50 air conditioner information; 51 air-conditioning communication line connection state; 52 operating state; 53 model data; 60 image analysis information; 61 infrared image; 62 human heat source information; 63 apparatus heat source information; 64 structure heat source information; 65 number-of-persons heat source information; 70 interlock setting information; 71 presence/absence interlock setting; 72 differentiated blowing setting; 73 heat quantity interlock setting; 81a to 81d air-conditioning communication line connection unit; 100 air-conditioning control system.

The invention claimed is:

1. An air-conditioning control device to control operation of a plurality of air conditioners, the air-conditioning control device comprising:
air conditioner management circuitry to manage operating states of the air conditioners;
image analysis circuitry to analyze image information obtained from an image sensor, to ascertain a person in each of air conditioning areas, the air conditioners providing controlled air conditioning for the air conditioning areas, and to identify a position where a person is present from a position of a block, the block being obtained by dividing each of the air conditioning areas into a plurality of blocks;
air-conditioning communication line connectors respectively for the air conditioning areas, the air-conditioning communication line connectors being connectable with air-conditioning communication lines, the air conditioners being connected to the air-conditioning communication lines;
air-conditioning communication line connection determination circuitry capable of determining whether or not each of the air conditioners is connected to a corresponding one of the air-conditioning communication line connectors via a corresponding one of the air-conditioning communication lines; and
an air-conditioning controller to provide, on a basis of number of persons in each of the air conditioning areas, air conditioning area-specific operation control for the air conditioners connected to the air-conditioning communication line connectors via the air-conditioning communication lines.

2. The air-conditioning control device according to claim 1, wherein
the air-conditioning communication line connection determination circuitry determines that an air conditioner is connected to the air-conditioning communication line connector via the air-conditioning communication line when the air-conditioning communication line is supplied with power via the air-conditioning communication line connector, and
the air-conditioning controller determines, on a basis of a determination result of the air-conditioning communication line connection determination circuitry, which air conditioning area has an air conditioner connected.

3. The air-conditioning control device according to claim 1, wherein
on a basis of a determination result of the air-conditioning communication line connection determination circuitry, the air-conditioning controller operates an air conditioner, providing controlled air conditioning for an air conditioning area where there is no person, in an energy-saving operation mode, the energy-saving operation mode enabling reduced energy consumption compared with a normal operation mode.

4. The air-conditioning control device according to claim 1, wherein
the image analysis circuitry further ascertains an apparatus in each of the air conditioning areas when analyzing the image information obtained from the image sensor, and
the air-conditioning controller provides the air conditioners with a wind direction control to provide a controlled indirect or direct wind for the person and a controlled direct wind for the apparatus.

5. The air-conditioning control device according to claim 1, wherein
the image analysis circuitry further ascertains an apparatus in each of the air conditioning areas when analyzing the image information obtained from the image sensor, and
the air-conditioning controller calculates a quantity of heat from a person and an apparatus in each of the air conditioning areas and, on a basis of the quantity of heat calculated, controls operation of an air conditioner providing control for each of the air conditioning areas.

6. The air-conditioning control device according to claim 1, wherein
remote controllers are connected to the air-conditioning communication lines, the remote controllers enabling setting of operating states of the air conditioners connected to the air-conditioning communication lines.

7. The air-conditioning control device according to claim 1, wherein
the air-conditioning communication line connectors are positioned respectively in respective directions of the air conditioning areas that are centered about an installation position of the air-conditioning control device.

8. An air-conditioning control system comprising:
a plurality of air conditioners; and
the air-conditioning control device according to claim 1 to control operation of the air conditioners.

* * * * *